June 24, 1958
C. V. FLEMING
2,840,041
CONVEYOR FOR POULTRY
Filed Jan. 25, 1956
2 Sheets-Sheet 1
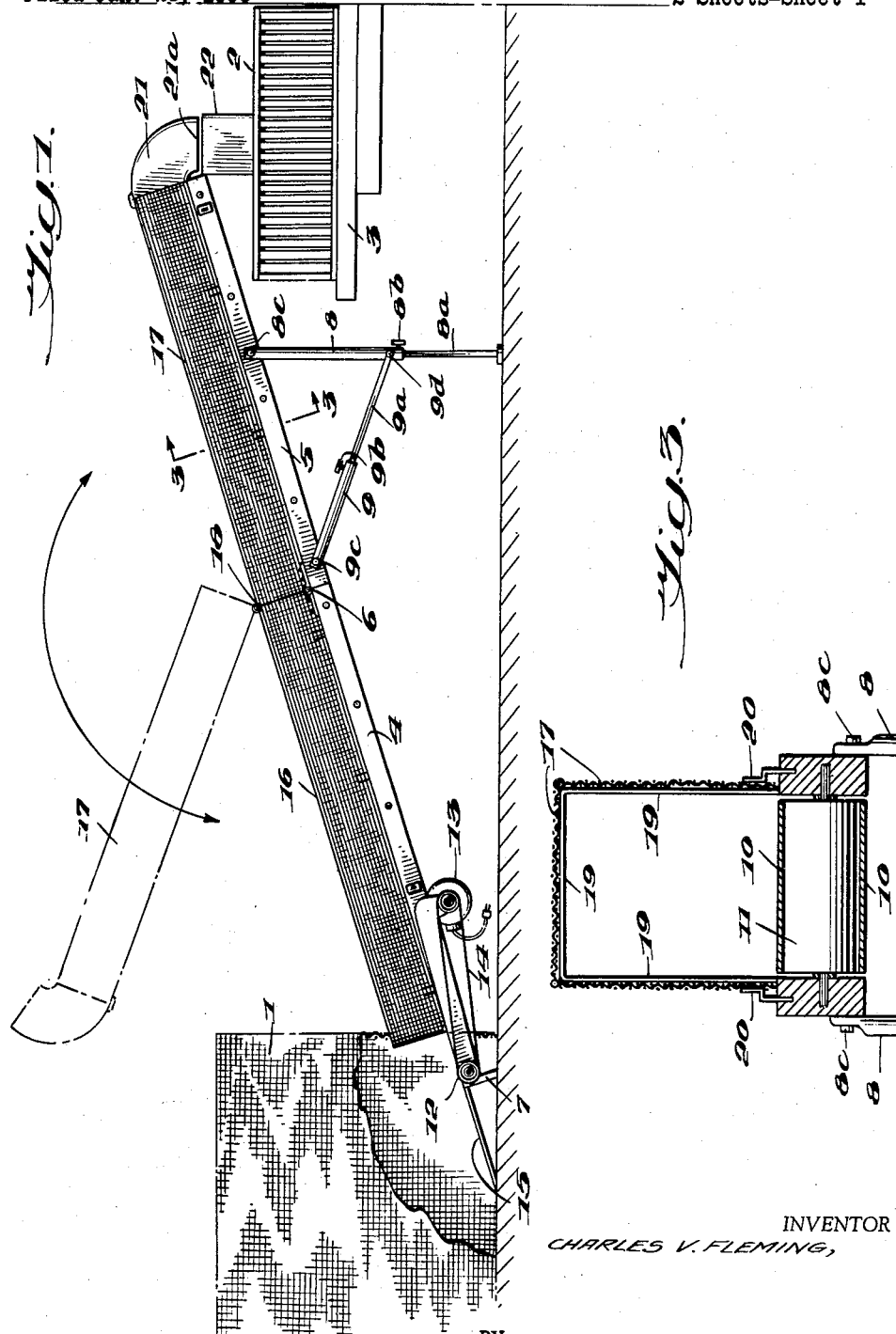
INVENTOR
CHARLES V. FLEMING,
BY
Stone, Boyden & Mack
ATTORNEYS

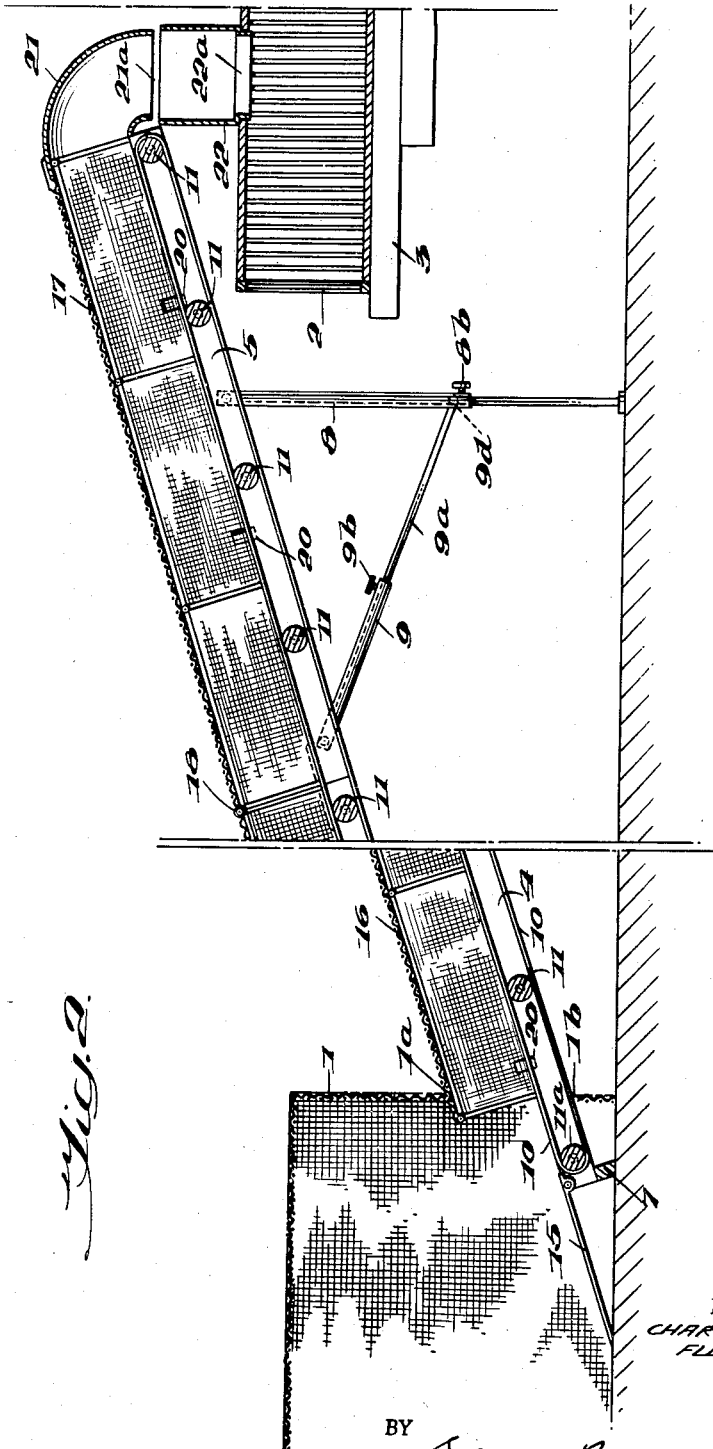

United States Patent Office 2,840,041
Patented June 24, 1958

2,840,041

CONVEYOR FOR POULTRY

Charles V. Fleming, Gainesville, Ga.

Application January 25, 1956, Serial No. 561,223

5 Claims. (Cl. 119—82)

This invention relates to a device for transferring poultry or small animals from one enclosure to another. It is particularly applicable to loading chickens into shipping crates and its use is desirable in that it facilitates loading by saving time and expense and that it accomplishes this without the injuries and bruises to the fowls and the resulting down-grading which accompany individual capture. The apparatus comprises in general a dispatching pin, a shipping crate and an intervening conveyor extending between those two parts.

One of the features of this invention relates to the combination of structures wherein a tunnel-like conveyor is adapted to extend between the dispatching pen or housing and the shipping crate whereby small animals or live fowls may be moved from the dispatching unit to the crate and in which crate they are to be shipped to market.

A refinement of the above mentioned arrangement of parts pertains to the structural arrangement whereby the receiving end of the conveyor is adapted to project into the dispatching pen so that there is no chance for the animals or poultry to escape between the wall of the pen and the adjacent end of the conveyor.

A further feature of advantage and utility resides in the fact that the conveyor belt on the approach side to the conveyor extends beyond the adjacent walls of the tunnel-like cover of the conveyor. By this arrangement, poultry which may alight on the conveyor belt are moved into the covered portion of the conveyor without becoming excited, whereas if the poultry were pushed into the space covered by the screened portion of the conveyor, they tend to resist such handling.

Another and obvious feature of advantage characterizing this invention resides in the fact that the elongated conveyor frame and its correspondingly elongated screen hood portion which forms the tunnel are both hinged separately so that they may be folded intermediate their lengths for convenient transportation and shipping.

The above and additional features of utility are described and claimed in the following specification and the structures are illustrated in the accompanying drawings, in which:

Fig. 1 is a side elevation of the device as set up for a loading operation.

Fig. 2 a longitudinal vertical central cross section taken from the same elevation as shown in Fig. 1.

Fig. 3 is a cross section taken on the line 3—3 of Fig. 1, and somewhat enlarged.

It is to be understood that the drawings do not show the exact structural details, which may vary, but do show the necessary component parts of the structure.

Referring now to the details of the several figures, Fig. 1 shows the apparatus as set up for a typical loading operation wherein 1 is the enclosure from which fowls are to be transferred and 2 is the enclosure to which the fowls are to be transferred, in this case, a shipping crate on the bed of a truck 3. The loading device consists of an elongated frame 4, which is made up of two parallel longitudinal members with appropriate cross bracing not shown and a similar frame 5, joined together by hinges 6 and supported at the lower end by plate 7 and at the upper end by supports 8 and 9. These supports consist of a pair of tubular members 8 which are connected to frame 5 by pivots 8c, and into which telescope the legs 8a as controlled by screws 8b. Attached to the lower part of each tube 8 by pivots 9d are arms 9a, which telescope into tubes 9 and which are in turn attached to frame 5 by pivots 9c. Screws 9b apply pressure to arms 9a and hold them steady after adjustment.

By referring to Fig. 2, it will be seen that mounted between and perpendicular to the longitudinal members of frames 4 and 5 is an endless belt 10 which is mounted on rollers 11 and 11a, spaced an appropriate distance apart to support the belt 10. Rollers 11, being idlers may either revolve on their shafts or be set up so that their shafts revolve in suitable bearings in the frames 4 and 5, but roller 11a, shown here to be the lower one, must be rigidly fixed to its shaft, one end of which extends through a bearing in frame 4 and has rigidly attached to it a pulley 12, to which power is applied through a belt 14 by the motor 13. At the lower end of frame 4 is pivoted a ramp 15 which allows the fowls to enter the conveyor as will be described.

On top of the conveyor as above described is mounted a removable cover. This cover consists of two sections 16 and 17 which are joined by a hinge 18. The cover sections 16 and 17 are mounted on rods 19, each of which has the shape of an inverted U. The lower end of each rod 19 rests on the frames 4 and 5 as shown in Fig. 3. At the lower edge of the cover sections 16 and 17 are metal brackets on clips 20, the upper portions of which are secured to the wire mesh of the cover and the lower ends of which project into sockets or holes therefor in the upper face of the frames 4 and 5, or are otherwise affixed to the frames as may be desired. To the end of section 17, distant from said hinge 18, is attached a hood or elbow 21, which prevents the fowl from escaping and directs them toward the receiving crate. Covering this framework is a foraminous material which is permeable to air but which will prevent the escape of the fowl, such as a wire mesh and which gives the sections 16 and 17 a tunnel like contour although the walls are open to the passage of air and considerable light. An additional conduit 22 is provided between the crate 2 and the elbow 21. The upper end of 22 is the same size and shape as the open end 21a of the hood or elbow 21, and its lower end 22a is designed to fit the opening in the receiving crate.

Changes in size and relative proportions of parts may be made without departing from the scope of this invention.

I claim:

1. In a conveying device, a tunnel like conveyor comprising the combination of a plurality of frames comprising two longitudinal side members spaced apart and each side member comprising a plurality of units abutting each other end to end and being joined by hinges; a plurality of rollers mounted within said frames; a belt extending around said rollers; means for driving said rollers and belt; a cover for said frame consisting of a plurality of sections of framework made in the shape of an inverted U and covered with a material which is permeable to air and closed to the passage of live fowls therethrough, one end section having a tubular elbow to control the direction of discharge at the end of the conveyor; a discharge conduit, one end of which corresponds in size and shape to the open end of said elbow, a cage at the end of said conveyor distant from said elbow, the adjacent end of said cover being adapted to project into said cage and said conveyor belt projecting beyond the cover and also into said cage, whereby live fowl may alight on said conveyor belt before being moved into the space beneath said cover.

2. In a conveying device, a tunnel like conveyor comprising the combination of a plurality of frames comprising two longitudinal side members spaced apart and each side member comprising a plurality of units abutting each other end to end, hinges connected to abutting ends; a plurality of parallel rollers mounted on said frames and transversely thereof; an endless belt extending over and around said rollers; means for driving said belt; a cover for said frame extending substantially the entire length thereof and consisting of a plurality of sections of framework made in the shape of an inverted U and comprising a material which is permeable to air and closed to the passage of live fowls therethrough, one end section having a tubular elbow to control the direction of discharge at the end of the conveyor; and a discharge conduit leading from said elbow and one end of which corresponds in size and shape to the open end of said elbow.

3. In a conveying device, the combination of an endless belt conveyor and a tunnel-like cover therefor extending substantially the length of said conveyor and having foraminous sides and top preventing egress of live fowl and the material of the top and sides being permeable to light and air rendering said conveyor suitable for the transfer of live fowl, said side walls and cover of said tunnel-like conveyor being in substantial abutting relationship with a side wall of said cage.

4. In a conveying device, the combination of an endless belt conveyor made up of hinged sections, and a detachable tunnel-like cover therefor extending substantially the length of said conveyor and made up of hinged sections and having foraminous sides and top, the material of the sides and top being permeable to light and air rendering said conveyor suitable for the transfer of live fowl.

5. In a conveying device, a cage for poultry having defining walls, a tunnel-like conveyor comprising side walls and a cover, and an endless belt serving as the floor to the conveyor, the receiving end of the conveyor belt projecting beyond the adjacent ends of the side walls and roof and into said cage, whereby when fowl alight on the receiving end of the conveyor belt, they are moved lengthwise of the conveyor by said belt, said side walls and cover of said tunnel-like conveyor being in substantial abutting relationship with a side wall of said cage.

References Cited in the file of this patent
UNITED STATES PATENTS

| | | |
|---|---|---|
| 845,078 | Gritton | Feb. 26, 1907 |
| 1,090,670 | Zimmerman | Mar. 17, 1914 |
| 2,457,407 | Sebastian | Dec. 28, 1948 |
| 2,608,310 | De Penning | Aug. 26, 1952 |
| 2,648,307 | Bowers | Aug. 11, 1953 |
| 2,675,783 | Sears | Apr. 20, 1954 |
| 2,744,615 | Ronk | May 8, 1956 |